S. T. YOUNG.
Car-Coupling.
No. 162,452.   Patented April 20, 1875.
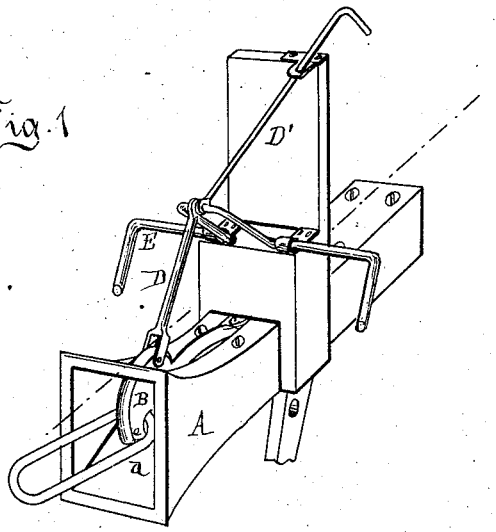
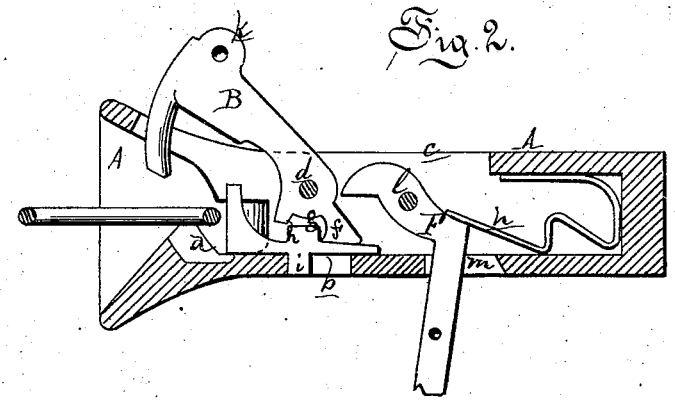
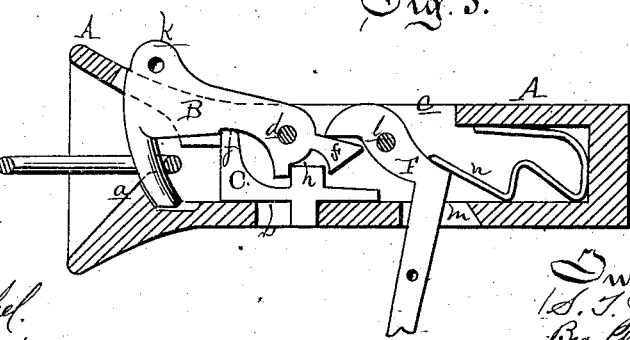

UNITED STATES PATENT OFFICE

SAMUEL T. YOUNG, OF HOWELL, MICHIGAN.

IMPROVEMENT IN CAR-COUPLINGS.

Specification forming part of Letters Patent No. 162,452, dated April 20, 1875; application filed March 6, 1875.

*To all whom it may concern:*

Be it known that I, SAMUEL T. YOUNG, of Howell, in the county of Livingston and State of Michigan, have invented an Improvement in Car-Couplings, of which the following is a specification:

The first part of my invention relates to an improvement in car-couplings, having for its object to so construct the same as to obviate the necessity of going between the cars to couple or uncouple them.

The second part of my invention relates to a device to be used in combination with the car-coupling, which will, as soon as the car leaves the rails, uncouple the derailed car from the rest, thereby preventing it from dragging others off the track.

Figure 1 is a perspective view. Fig. 2 is a longitudinal vertical section, showing the position of the parts when the car is uncoupled. Fig. 3 is a similar section, showing the relative position of the parts when the draw-bar is coupled to that of another car.

In the drawing, A represents a bell-mouthed draw-head of the usual form externally. At the bottom, inside the throat of the bell-mouth, there is a cavity behind a shoulder, $a$, behind which a slot, $b$, is made in the bottom, while in the top there is a much longer slot, $c$, in which there is hung, by a pivot, $d$, a dog, B, having a hook, $e$, under the front end, which is inclined or sloped backward and downward. At the rear end of the dog is a lug, $f$, in front of which, on the under side, a square notch, $g$, is cut, which receives the head $h$ of a tumbler, C, which slides on the bottom of the draw-head cavity. It has a lug, $i$, on the bottom, which plays in the slot $b$ therein, which limits the longitudinal movement of the tumbler. At the front end of the dog there is a raised head, $j$, on which the dog rests when coupled. An ear, $k$, of the dog projects above the top of the draw-head, and is perforated to receive the pivot-pin of a forked rod, D, which has its upper end strapped on the crank turned in a rock-shaft, E, journaled across the end of the car, its extremities being bent to a right angle to form levers, which can be turned to throw the crank up, drawing up the dog B, whose lug $f$ pushes forward the tumbler C until its head $h$ comes under the shoulder in front of the notch $g$, when the dog B will be sustained in an elevated position. If, now, an entering link of an opposing draw-head strikes the head $j$ of the tumbler C, the latter will slide back, when the dog will drop, and its hook pass through the link, thus coupling the two cars together. For freight-cars a rod, D', is connected with the crank of the rock-shaft E, and carried up to the top of the car, to enable the brakeman on top to couple or uncouple, as may be necessary.

The second feature of my invention is a bell-crank lever, F, pivoted at $l$ in the back part of the draw-head, its longer arm hanging through a slot, $m$, in the bottom of the draw-bar, but thrown forward by a spring, $n$, inserted in the back end of the cavity. The short arm of the lever rests upon the lug $f$ of the dog, when the latter is in engagement with a link. The long arm is intended to hang as low, or as near to the ground, as the bottom of the locomotive-pilot, so that in case the car leaves the track the end of said lever will catch on a tie or drag in the ballast, and immediately uncouple the car.

What I claim as my invention, and desire to secure by Letters Patent, is—

1. The combination, with the draw-head A, having the shoulder $a$ and slots $b$ $c$, of the dog B, pivoted at $d$, and having the lug $f$ and notch $g$, and the tumbler C, provided with raised head $j$, head $h$, and lug $i$, substantially as described and shown.

2. The bell-crank lever F hung in the back part of the draw-head A, in combination with the lug $f$ of the dog B, substantially as and for the purpose set forth.

SAMUEL T. YOUNG.

Witnesses:
   H. F. EBERTS,
   H. S. SPRAGUE.